United States Patent [19]
MacLeod

[11] Patent Number: 5,402,941
[45] Date of Patent: Apr. 4, 1995

[54] VEHICLE RECOVERY TRACTION MAT WITH LOCKABLE HINGED SECTIONS

[76] Inventor: Angus C. MacLeod, P O Box 69973, Bryanston, Transvaal Province, South Africa

[21] Appl. No.: 124,391

[22] Filed: Sep. 20, 1993

[30] Foreign Application Priority Data

Nov. 4, 1992 [ZA] South Africa ............... 92/8506
May 5, 1993 [ZA] South Africa ............... 93/3165

[51] Int. Cl.6 ............................................. E01B 23/00
[52] U.S. Cl. .................................................... 238/14
[58] Field of Search ........................... 238/14; 180/313

[56] References Cited

U.S. PATENT DOCUMENTS

| 1,375,666 | 4/1921 | Bauer | 238/14 |
| 1,410,055 | 3/1922 | Brian | 238/14 |
| 1,502,123 | 7/1924 | Sall | 238/14 |
| 1,683,411 | 9/1928 | Remmers | 238/14 |
| 1,732,975 | 10/1929 | Lindner | 238/14 |
| 2,479,760 | 8/1949 | Merrick | 238/14 |
| 3,701,474 | 10/1972 | Welz | 238/14 |

FOREIGN PATENT DOCUMENTS 891945 2/1972 Canada ................... 238/14

Primary Examiner—Robert J. Oberleitner
Assistant Examiner—S. Joseph Morano
Attorney, Agent, or Firm—Abelman, Frayne & Schwab

[57] ABSTRACT

A vehicle recovery aid (10), suitable for use in providing traction and support to a wheeled vehicle is elongate and has two ends. The aid (10) includes a plurality of longitudinally spaced wheel support elements (12) for supporting at least one wheel of the wheeled vehicle. At least some of the support elements (12) are hingedly interconnected to permit the aid (10) to conform to the shape of a surface on which it is laid.

15 Claims, 4 Drawing Sheets

VEHICLE RECOVERY TRACTION MAT WITH LOCKABLE HINGED SECTIONS

THIS INVENTION relates to a vehicle recovery aid. It relates in particular to a vehicle recovery aid for providing traction to a wheel of a wheeled vehicle as an aid in extricating the vehicle if it has become stuck in sand, mud or the like.

According to the invention there is provided a vehicle recovery aid suitable for use, particularly though not exclusively, in providing traction and support to a wheeled vehicle stuck in sand, mud, or the like, the aid being elongate, having two ends, and comprising a plurality of longitudinally spaced interconnected wheel support elements for supporting at least one wheel of the wheeled vehicle, at least some of the support elements being hingedly interconnected so as to permit the aid to conform to the shape of a surface on which it is laid.

Hence, in use, when a vehicle is stuck in sand, mud, or the like the recovery aid can be positioned in front of one or more of the driving wheels of the vehicle to provide traction to said wheel and permit the vehicle to be driven out of the sand, mud or the like.

The aid may include hinge mechanisms whereby each wheel support element is hingedly connected to each adjacent wheel support element. The vehicle recovery aid may thus be folded or rolled up for storage purposes.

Each hinge mechanism may include releasable locking means for releasably locking the mechanism so that, in the locked state, the locking means prevents operation of the mechanism.

Each hinge mechanism, connecting the wheel support elements, may comprise at least one linking member connected to, and extending between, adjacent support elements, the linking member being pivotally connected to at least one of said support elements. Preferably, each linking member is pivotally connected to both of said support elements so that each support element is independently pivotal with respect to the linking member.

At least some of the support elements may be provided with strengthening formations such as ribs or the like. Some of the support elements may, instead, have irregular cross-sectional profiles having thicker and thinner zones, the thickness enhancing the rigidity of the element.

Each wheel support element may comprise a body having opposed ends and a pair of pivot pin support members connected to the opposed ends of the body, each hinge mechanism including a pair of pivot pins supported, respectively, in the pivot pin support members of adjacent support elements and the, or each, linking member being pivotally mounted on the pivot pins.

Each pivot pin support member may be tubular having a pair of opposed ends, the associated pivot pin being dimensioned such that it extends through the pivot pin support member with end portions of the pivot pin protruding from the opposed ends the pivot pin support member and each hinge mechanism including a pair of linking members which are mounted on the protruding end portions of the pivot pins.

Each linking member may comprise a link plate having a pair of spaced apart holes therethrough through which the corresponding protruding portions of the pivot pins of adjacent support elements extend, the vehicle recovery aid including retaining elements mounted on the pivot pins for retaining the link plates in position on the pivot pins. Preferably, the retaining elements are removably mounted on the pivot pins to permit the wheel support elements to be disconnected and thereby permit replacement of a wheel support element should the need arise.

For example, each pivot pin may have a major part with a non-circular (eg. square, hexagonal or the like) cross-sectional profile and end portions with circular cross-sectional profiles, the associated pivot pin support member and hole in the, or each, linking plate having complementary non-circular cross-sectional profiles so that each pivot pin is non-rotatably received in its pivot pin support member and, by positioning the link plate on that portion of the pivot pin having a circular cross-sectional profile, relative rotation between the link plate and the pivot pin is permitted, and, by positioning the link plate on that portion of the pivot pin having a non-circular cross-sectional profile, relative rotation between the link plate and the pivot pin is resisted and the mechanism is locked, thereby effectively preventing displacement of the support elements relative to one another.

The body of each wheel support element may be generally rectangular when viewed in plan and each may have a generally corrugated appearance comprising alternating transversely extending valleys and ridges. The vehicle recovery aid may include at least one wheel traction element forming at least one of the ends of the aid, the traction element being hingedly connected to an adjacent wheel support element, to provide traction to the wheel of the wheeled vehicle to enable the vehicle to be driven onto the wheel support elements.

. Each wheel traction element may comprise a flat body which is generally square or rectangular when viewed in plan and which has a plurality of operatively upwardly directed, gripping or traction formations in the form of raised ridges, teeth, studs or the like to enable the wheel of the wheeled vehicle to gain purchase on the wheel traction element so that it can be driven up onto the associated wheel support element. The articulated construction of the recovery aid will thus facilitate placing the wheel traction element of the aid adjacent a wheel of the wheeled vehicle with no or little digging.

Each wheel traction element may have a pivot pin support member and the recovery aid may have at least one end hinge mechanism which includes a pivot pin supported in one of the pivot pin support members of the wheel support element and in the pivot pin support member of the associated wheel traction element on which pivot pin the wheel support element and the wheel traction element are pivotally mounted.

The pivot pin support members of the wheel support element and the wheel traction elements may, instead, each include a pair of tubular or part tubular members, spaced from each other, through which the pivot pin passes. Either or both of the pairs of pivot pin support members may be releasably or removably connected to the pivot pin so that the wheel traction element can be removed from the aid.

The wheel support elements may, further, be provided with gripping formations, such as raised ribs, studs or the like to assist in providing traction to the wheel of the vehicle. In particular, the gripping formations may be in the form of a plurality of laterally extending raised ridges, parts of which have been omitted or taken away to provide parallel tooth-like rows of discontinuous ridges.

After use, the vehicle recovery aid is frequently partly embedded in the sand, or the like from which the wheeled vehicle has been recovered.

Accordingly, the vehicle recovery aid may, further, include an extracting member for extracting the aid from the sand, or the like after the aid has been used. The extracting member may be in the form of an elongate flexible member such as a cable, web, rope, or the like connected to one of the elements e.g. to a wheel support element or to one of the wheel traction elements. The member is, preferably, an elongate web such as a nylon web connected to or near to one of the wheel traction elements. The web may for example be connected to the pivot pin between one of the wheel traction elements and the adjacent wheel support member.

The web may then be used to secure the aid in its folded up configuration, after it has been folded up for storage, by for example wrapping or looping it around the aid and tying it in position.

The support elements may be provided in different widths. For example in the case of heavy trucks, buses and the like, the support elements may be broad so that they may support the relatively broader wheels of such vehicles, whereas in the case of smaller vehicles such as passenger or light delivery vehicles the support elements may be correspondingly narrower to accommodate the relatively narrower wheels of such vehicles.

The width of the vehicle recovery aid will typically be chosen so that the aid is receivable in the track or depression made by a tire of the wheeled vehicle. Hence, the width of the aid may be between about 200 mm and about 600 mm.

The wheel support elements and the wheel traction elements may preferably be of a strong, light-weight, material to facilitate handling and stowing/transport thereof. For example the elements may be of aluminium alloy or a synthetic polymeric material such as high density polyethylene (HDPE), polytetrafluoroethylene (PTFE) or the like.

Preferably, each wheel support element and each wheel traction element is extruded in one piece.

The elements may, instead, be of fabricated steel.

According to another aspect of the invention there is provided a wheel support element for a vehicle recovery aid as hereinbefore described, the support element including a body having opposed ends, and a pair of pivot pin support members connected to the opposed ends.

According to another aspect of the invention there is provided a wheel traction element as hereinbefore described for a vehicle recovery aid as hereinbefore described.

The invention will now be described, by way of example, with reference to the accompanying diagrammatic drawings, in which FIG. 1 shows a side view of an embodiment of a vehicle recovery aid in accordance with the invention in use;

Figure 1:
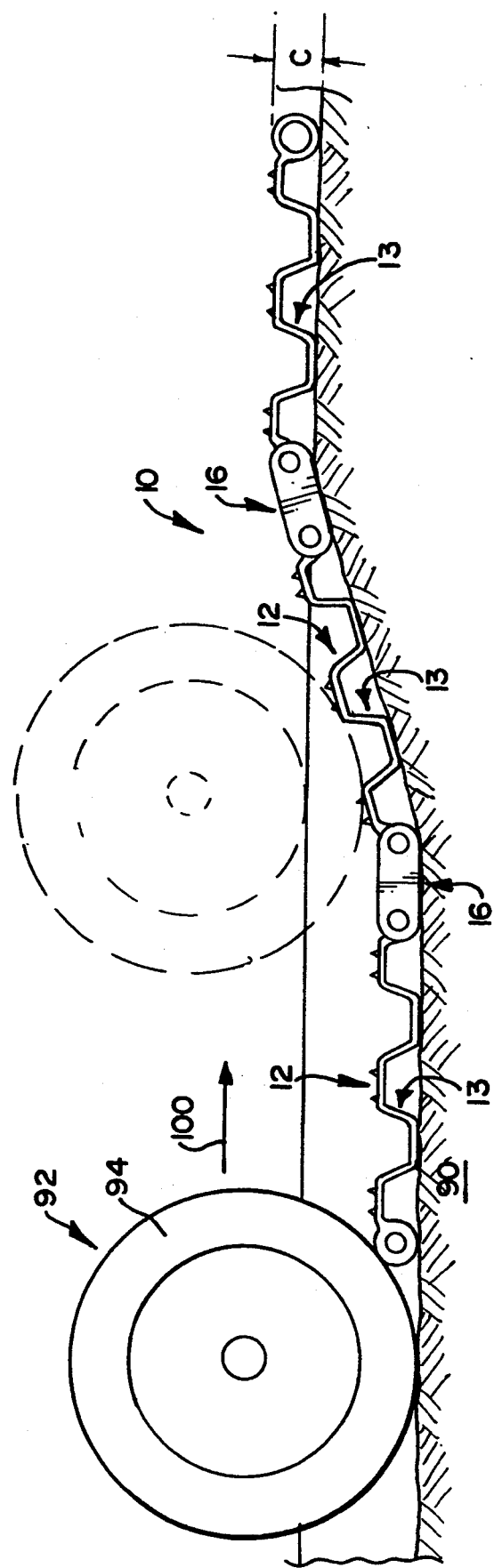

In the drawings, reference numeral 10 generally indicates a vehicle recovery aid in accordance with the invention.

The vehicle recovery aid 10 is elongate and comprises a plurality of longitudinally spaced wheel support elements, each generally indicated by reference numeral 12, and a plurality of hinge mechanisms, each generally indicated by reference numeral 16, linking adjacent wheel support elements 12 together.

Figure 2:
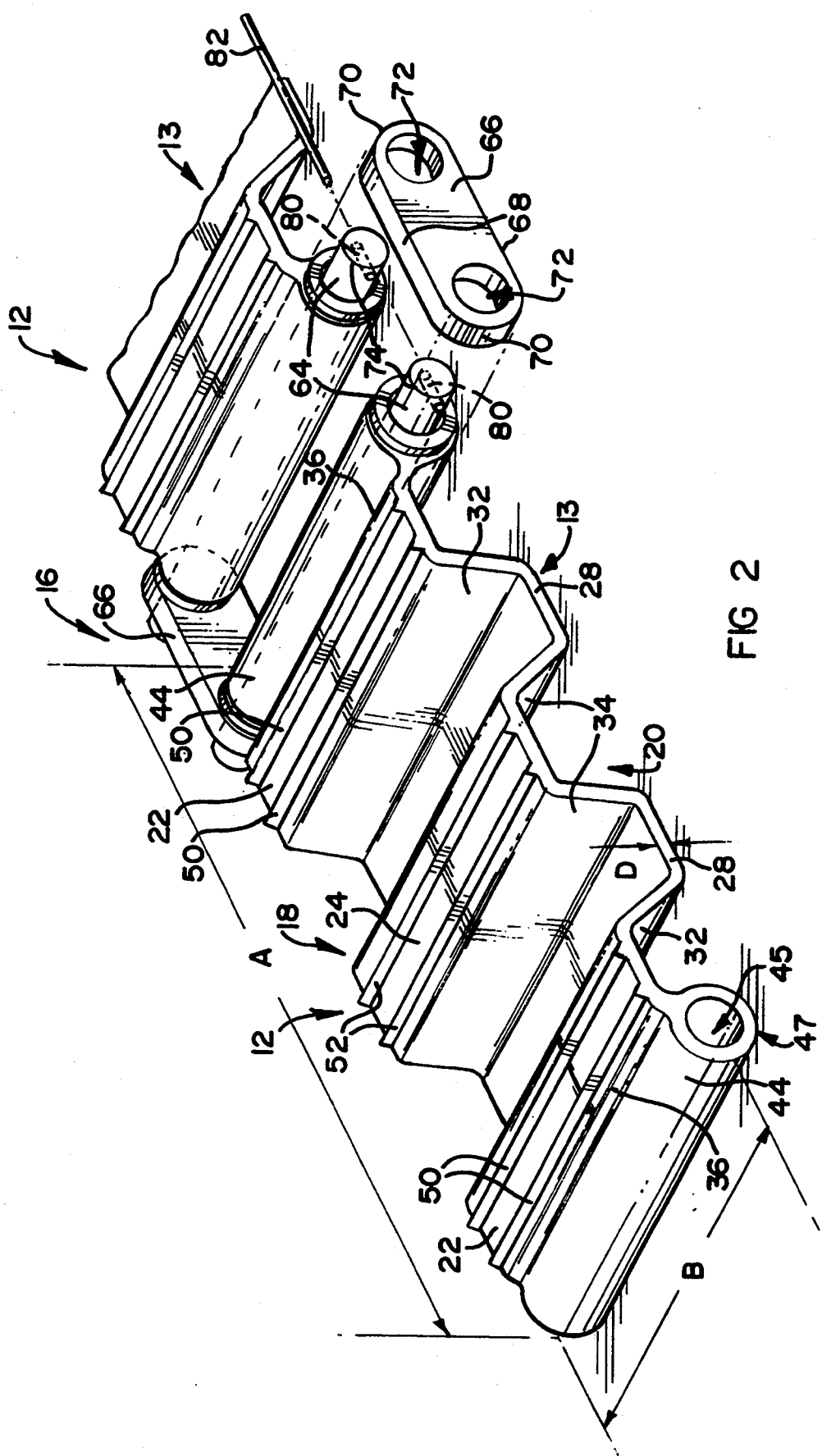
FIG. 2 shows a partly exploded three-dimensional view of a portion of the vehicle recovery aid of FIG. 1.

In FIG. 2 only a portion of the recovery aid 10, comprising a pair of the wheel support elements 12, one of which is shown in part only, and a hinge mechanism 16 is depicted.

The support elements 12 are of extruded aluminium alloy construction and each has a body 13 having an upper side 18 over which, in use, a wheel of a wheeled vehicle may be driven and a lower side 20 which functions as a base on which, in use, the support element 12 rests. The body 13 of the support element 12 is rectangular in plan view having a pair of edges 36 which are integral with two pivot pin support members in the form of hollow open-ended cylinders 44 as is described in further detail below.

Each upper side 18 includes three rectangular generally planar traction portions, namely two end portions 22 and a central portion 24 which, in use, provide traction to the wheel of the vehicle. Each lower side 20 includes two rectangular generally planar base portions 28 on which, in use, the support element 12 rests. The base portions 28 are connected to the traction portions 22 by two upwardly sloping rectangular shoulders 32 and the traction portion 24 is connected to the base portions 28 by two downwardly sloping rectangular shoulders 34. The portions 22 and 24 are coplanar, similarly, the portions 28 are coplanar. The support element 12 thus presents a crenellated or corrugated profile when seen from the side as can more clearly be seen in FIG. 1.

Each hollow open-ended cylinder 44 defines an open-ended cylindrical cavity 45. Each cylinder 44 has its cylinder axis parallel with the edge 36 of the body 13 to which it is attached, and positioned between the planes defined by the portions 22, 24 and the portions 28 respectively. Further, the plane defined by the base portions 28 intersects the side-wall of each cylinder 44 at 47, tangentially thereto. Each cylinder 44 thus serves, in use, as an additional support on which the element 12 rests.

Each traction portion 22, 24 respectively is provided with gripping formations in the form of pairs of parallel spaced upwardly directed ridges 50, 52 respectively, each having a triangular cross-sectional profile. The ridges 50, 52 are parallel with the longer edges of the rectangular portions 22, 24.

The hinge mechanism 16 includes a pair of cylindrical pins 64, and a pair of generally rectangular planar link plates 66, each having a pair of longer edges 68 and a pair of shorter edges 70, the shorter edges being curved as can more clearly be seen in FIG. 2. The pins 64 are received in the cylindrical cavities 45 of the cylinders 44 of adjacent support elements 12. Each link plate 66 has a pair of circular apertures 72 adjacent its shorter edges 70. The pins 64 are longer than the cylinders 44 and end portions 74 of the pins 64 protrude from the cylinders 44. Apertures 80 extend diametrically through each end portion 74 near its face or end. In FIG. 2 the hinge mechanism 16 is shown in a partly disassembled state. In use, the end portions 74 of the pins 64, which are of smaller diameter than the remainder of the pins, are received in and pass through the apertures 72 of the link plate 66. The link plate 66 is secured in position by a retaining pin 82, which extends through the apertures 80. In an embodiment of the invention the pin 82 is a Mills Pin (Trade Mark). Each support element 12 is thus pivotal about a pin 64 at each of its ends.

Typically about ten of the support elements will be linked together by the hinge mechanisms to form the vehicle recovery aid of the invention.

Figure 4:
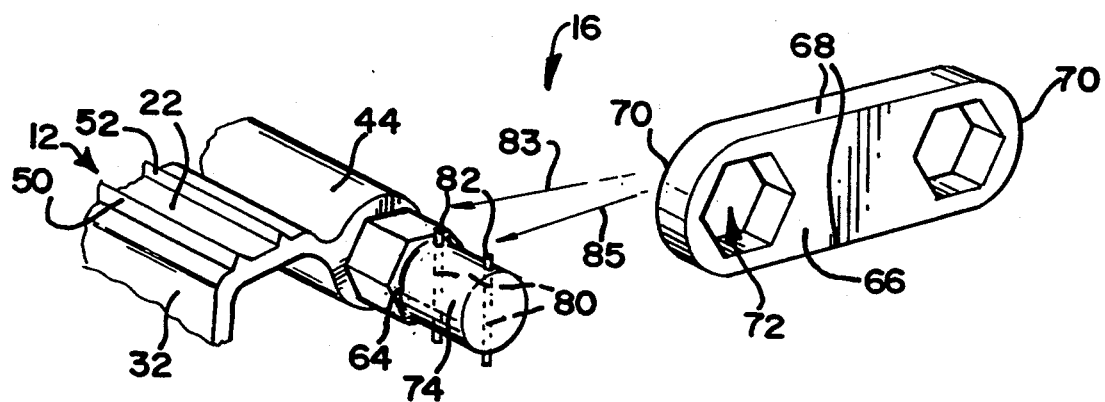
FIG. 4 shows a part of a hinge mechanism embodying a locking mechanism in accordance with the invention.

Referring to FIG. 4, in another embodiment of the invention the hinge mechanism 16 is releasably lockable. In this embodiment each cylindrical cavity 45 has a hexagonal cross-sectional profile and each pin 64 has a complementary hexagonal cross-sectional profile which extends outwardly only partly over the end portion 74. The remainder of the end portion 74 has a circular profile. Each pin 64 is thus non-rotatably mounted in its cavity 45. In this embodiment of the invention each aperture 72 also has a hexagonal cross-sectional profile complementary to the hexagonal cross-sectional profile of the pin 64. Further, in this embodiment of the invention, two apertures 80 for receiving securing pins 82 are provided in the end portion 74, one near to the end of the end portion 74 and one near to the cylinder 44 so that the link plate 66 can be adjusted between a first position indicated by the arrow 83 in which it is adjacent to and abutting the cylinders 44 with the hexagonal cross-sectional profile of the end portion 74 and the aperture 72 engaged with one another so that rotation of the pin 64 relative to the link plate 66 is prevented, and a second position indicated by the arrow 85 in which it is remote from the cylinder 44 and in which only that part of the end portion 74 with a circular profile extends into the aperture 72 so that rotation of pin 64 relative to the link plate 66 is allowed. In the first position the link plate is positioned between the cylinder 44 and the pin 82 in the aperture nearest the cylinder 44 and in the second position it is positioned between the pins 82 in the two apertures 80.

In other embodiments of the invention (not shown) only some of the hinge mechanisms 16 are releasably lockable as described above.

Figure 3:
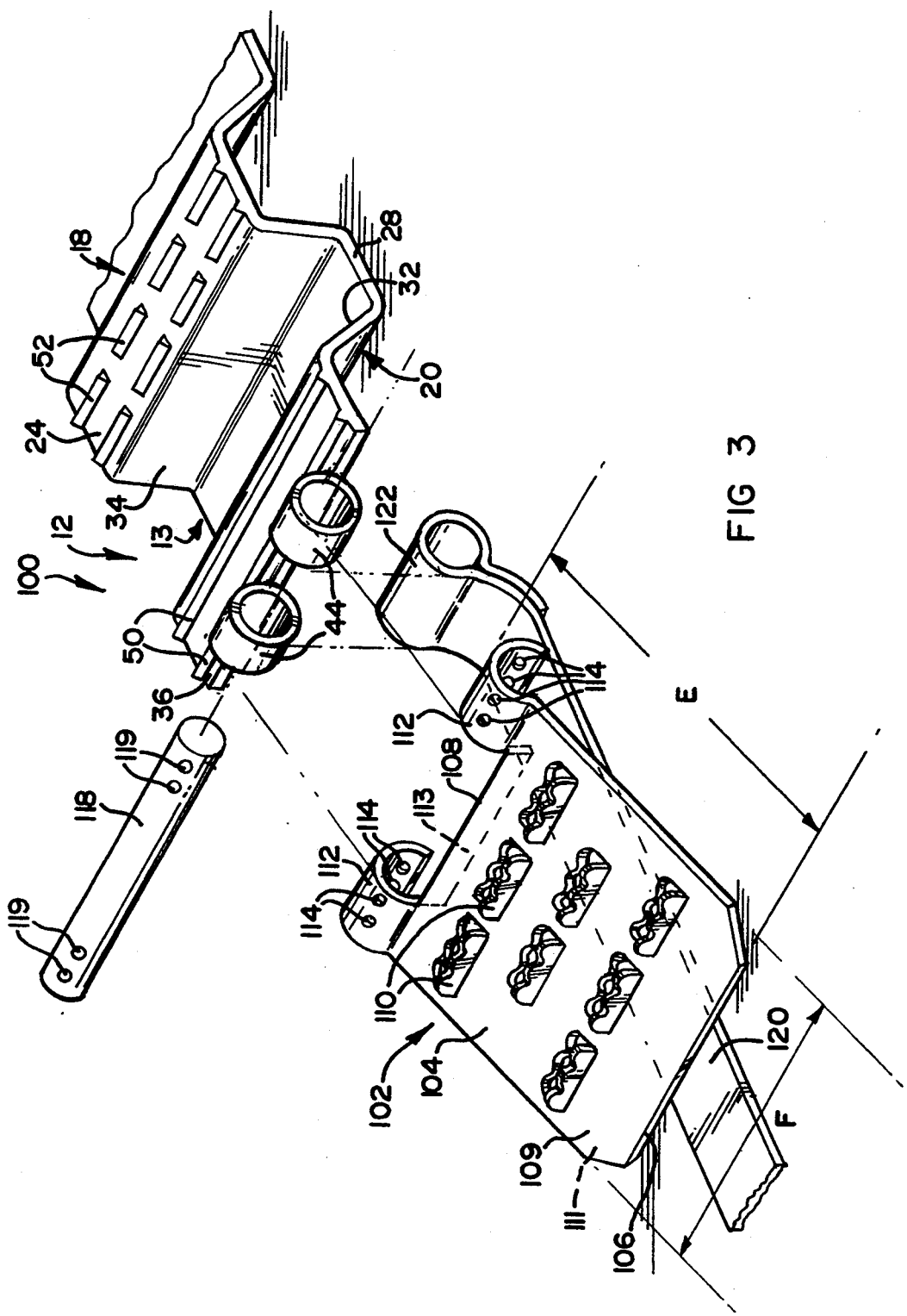
FIG. 3 shows an exploded view of an end portion of another embodiment of a vehicle recovery aid incorporating a wheel traction element.

FIG. 3, shows an exploded view of an end portion of another embodiment 100 of a vehicle recovery aid in accordance with the invention. The same numbers have been used to indicate the same or similar features of the recovery aids 10 and 100. Only one wheel support element 12 is shown in the FIGURE. The end portion includes the wheel support element 12 and a wheel traction element 102.

The wheel support element 12 has two co-axial pivot pin support members in the form of two open-ended cylinders 44 arranged symmetrically on the edge 36 and spaced from each other instead of one, as in the embodiment 10. Each cylinder 44 has its cylinder axis co-planar with the portion 22.

The ridges 52 of the traction portion 24 and the remaining ridges 50, 52 of the other traction portions 22, 24 have partly been omitted or taken away so that the ridges are discontinuous and tooth-like for improved traction, as can be seen in FIG. 3.

The wheel traction element 102 consists of a rectangular generally planar body 104 having a leading edge 106 and a trailing edge 108, an upper face 109 and a lower face 111. The leading edge 106 has cut away end corners or chamfered end corners so that it is generally wedge-shaped as can be seen in FIG. 3. Traction formations in the form of elongate laterally extending upwardly directed tabs 110 parallel to the edges 106, 108 and having serrated upper edges project operatively upwardly from the upper face 109 of the body 104.

The tabs 110 are arranged in three rows, the first row adjacent the leading edge 106 consisting of three tabs 110, the third row adjacent the trailing edge 108 consisting of three tabs 110 and the second row, approximately midway between the other two rows, consisting of two tabs 110. Each tab 110 is formed by making a broad generally U-shaped cut in the body 104 and bending the portions of the body 12 defined by the U-shape upwardly to form the tabs 110.

A pair of part-cylindrical pivot pin support members 112 project from the outer end portions of the trailing edge 108. Each pivot pin support member 112 is provided with two pairs of opposed holes for receiving securing members (not shown) in the form of rivets. A flange 113 projects downwardly from the lower face 111 of the body 104 adjacent the trailing edge 108 between the part-cylindrical members 112.

In use, a pivot pin 118, similar to the pivot pin 64, passes through the cylinders 44 and the part-cylindrical members 112 hingedly to link the wheel traction element 102 to the wheel support clement 12. The pivot pin 118 is provided with pairs of holes 119 near its ends. The part cylindrical members 112 are secured to the pivot pin 118 by the rivets which pass through the holes 114 and the holes 119.

An extracting member in the form of an elongate nylon web 120 which is about 2 m long is secured to the pivot pin 118 between the cylinders 44 by a loop 122 through which the pivot pin 118 passes.

It is to be appreciated that the various dimensions of the recovery aid 10 may depend on the particular application for which the recovery aid is intended. However, the Applicant believes that a recovery aid comprising wheel support elements 12 that have the following approximate dimensions i.e. a length A of 194 mm, a width B of 200 mm, a height C of 22 mm and a thickness D of 3,2 mm and a wheel traction element 102 having the following approximate dimensions i.e. a length E of 130 mm, a width F of 200 mm, a thickness of 3 mm and with the rows of tabs 110 being approximately 35 mm apart, each tab 110 being 10 mm high and 52 mm long, the first row of tabs 110 being 35 mm from the leading edge, and the third being 25 mm from the trailing edge, will work satisfactory. Each of the ridges 50, 52 typically has a height of about 3 mm.

In use, referring to FIG. 1, if a vehicle (not shown) becomes stuck, for example in soft sand 90, the recovery aid 10 or 100, as the case may be, is unrolled and laid in the vehicle tracks leading to a driving wheel 92 of the vehicle. A portion of the end of the recovery aid 10 or the wheel traction member 102 in the case of the embodiment shown in FIG. 3 is then forced under the wheel 92 and into the sand beneath the wheel 92 so that the tire 94 of the wheel 92 can gain purchase on the first support element of the recovery aid 10 or on the traction member 102 as the case may be. The vehicle can then be driven in the direction of the arrow 100 thereby extricating the vehicle from the soft sand.

The Applicant believes that it is an advantage of the invention illustrated that the vehicle recovery aid 10 or 100 can be partly inserted under the wheel 92 of the vehicle with a minimum of digging and, in particular, without the necessity of having to jack the vehicle up to any large extent or at all. Once the wheel has gained purchase on the first support element 12 of the aid 10, or the traction member 102 the crenellated cross-sectional profile of each element 12 or the tabs 110 as the case may be and the gripping formations 50, 52 will provide traction for the wheel 92 so that the vehicle can be driven out of the soft sand. In addition, the weight of the vehicle will generally cause the support element, at least partly, to be driven into the soft sand where the crenellated cross-sectional profile will provide traction between the element and the sand causing it to grip the sand so that it is not readily forced out from under the wheel. The nylon web 120 will then enable a user of the aid 100 to pull the aid out of the sand after use.

The Applicant believes, further, that it is an advantage of the invention illustrated that, unlike other recovery aids which are of a rigid material, because the vehicle recovery aid is articulated, it can readily be laid in the wheel tracks of a vehicle where it will follow the profile of the ground and of the wheel tracks leading to the driving wheel 92 of the vehicle. In addition, should the aid 10 or 100 as the case may be forced out from beneath the wheel 92, the articulations will cause it to collapse. This should reduce the distance that the aid 10 or 100 could be projected by the wheel and thereby reduce the danger of injuries caused by the aid 10 or 100 striking a person. The Applicant believes that this is an advantage over the prior art rigid vehicle recovery aids which may more likely be the cause of injuries if they are forced out from beneath the wheel of a vehicle since they are likely to be forced out over a greater distance. The Applicant believes that it is a further advantage of the invention illustrated that, because the recovery aid 10 or 100 as the case may be is articulated, it can readily be folded or rolled up and stored in a vehicle rather than having to be tied to the roof or onto the side of the vehicle as is the case if the recovery aid is of a conventional kind which is made of a rigid material. The web 120 may then be used to tie up the rolled up aid 100. This will enable the aid 10 or 100, as the case may be, to be a permanent accessory in a vehicle such as a four wheel drive vehicle, a truck or the like. The Applicant believes that use of the aid 10 or 100 will also result in a reduction in environmental damage which is frequently caused when a driver of a vehicle which has become bogged down in soft sand or mud cuts down small trees or saplings or cuts branches from trees to insert under the driving wheels of the vehicle to aid in extricating the vehicle from the sand or mud. Yet another advantage of the invention is that the support elements 12 and the traction member 102 are disconnectable thereby permitting replacement of a damaged support element 12 or of a damaged traction member 102.

I claim:

1. A vehicle recovery aid suitable for use in providing traction and support to a wheeled vehicle, the aid being elongate, having two ends, and comprising a plurality of longitudinally spaced interconnected wheel support elements for supporting at least one wheel of the wheeled vehicle, adjacent support elements being hingedly interconnected by a hinge mechanism so as to permit the aid to conform to the shape of a surface on which it is laid, each hinge mechanism having a released state in which the support elements are relatively displaceable, and a locked state in which relative displacement between the support elements is inhibited and comprising at least one linking member connected to, and extending between adjacent support elements, the linking member being pivotally connected to at least one of said support elements when the hinge mechanism is in its released state.

2. A vehicle recovery aid as claimed in claim 1, in which each linking member is pivotally connected to the adjacent support elements so that each support element is independently pivotal with respect to the linking member when the hinge mechanism is in its released state.

3. A vehicle recovery aid as claimed in claim 2, in which each wheel support element comprises a body, having opposed ends, and a pair of pivot pin support members connected to the opposed ends of the body, each hinge mechanism including a pair of pivot pins supported, respectively, in the pivot pin support members of adjacent support elements and the, or each, linking member being mounted on the pivot pins.

4. A vehicle recovery aid as claimed in claim 3, in which each pivot pin support member is tubular having a pair of opposed ends, the associated pivot pin being dimensioned such that it extends through the pivot pin support member with end portions of the pivot pin protruding from the opposed ends of the pivot pin support member and each hinge mechanism including a pair of linking members which are mounted in the protruding end portions of the pivot pins.

5. A vehicle recovery aid as claimed in claim 4, in which each linking member comprises a link plate having a pair of spaced apart holes therethrough through which the corresponding protruding portions of the pivot pins of adjacent support elements extend, the vehicle recovery aid including retaining elements mounted on the pivot pins for retaining the link plates in position on the pivot pins.

6. A vehicle recovery aid as claimed in claim 5, in which each pivot pin has a major part with a non-circular cross-sectional profile and end portions with circular cross-sectional profiles, the associated pivot pin support member and hole in the, or each, linking plate having complementary non-circular cross-sectional profiles so that each pivot pin is non-rotatably received in its pivot pin support member and, by positioning the link plate on that portion of the pivot pin having a circular cross-sectional profile, relative rotation between the link plate and the pivot pin is permitted and, by positioning the link plate on that portion of the pivot pin having a non-circular cross-sectional profile, relative rotation between the link plate and the pivot pin is resisted and the mechanism is locked.

7. A vehicle recovery aid as claimed in claim 3, in which the body of each wheel support element is generally rectangular when viewed in plan and has a generally corrugated appearance comprising alternating transversely extending valleys or ridges.

8. A vehicle recovery aid as claimed in claim 1, which includes at least one wheel traction element forming at least one of the ends of the aid, the traction element being hingedly connected to an adjacent wheel support element, to provide traction to the wheel of the wheeled vehicle to enable the vehicle to be driven onto the wheel support elements.

9. A vehicle recovery aid as claimed in claim 8, in which each wheel traction element comprises a flat body which is generally rectangular when viewed in plan and which has a plurality of operatively upwardly directed, gripping or traction formations to enable the wheel of the wheeled vehicle to gain purchase on the wheel traction element so that it can be driven up onto the associated wheel support element.

10. A vehicle recovery aid as claimed in claim 1, which includes an extracting member for extracting the aid after the aid has been used.

11. A vehicle recovery aid as claimed in claim 10, in which the extracting member is in the form of an elongate flexible member connected to one of the elements.

12. A vehicle recovery aid as claimed in claim 1, in which each of at least some of the wheel support elements is in the form of an extrusion.

13. A vehicle recovery aid as claimed in claim 12, in which at least one gripping formation protrudes upwardly from the bodies of at least some of the wheel support elements to improve traction between the wheel of a wheeled vehicle and the wheel support elements.

14. A vehicle recovery aid as claimed in claim 13, in which each gripping formation is in the form of a transversely extending upwardly directed ridge.

15. A vehicle recovery aid as claimed in claim 14, in which at least some of the ridges are discontinuous.

* * * * *